June 5, 1962 D. KNOLL ET AL 3,037,730
ELECTRICAL APPLIANCE AND SURFACE MOUNTING MEANS THEREFOR
Filed June 20, 1960
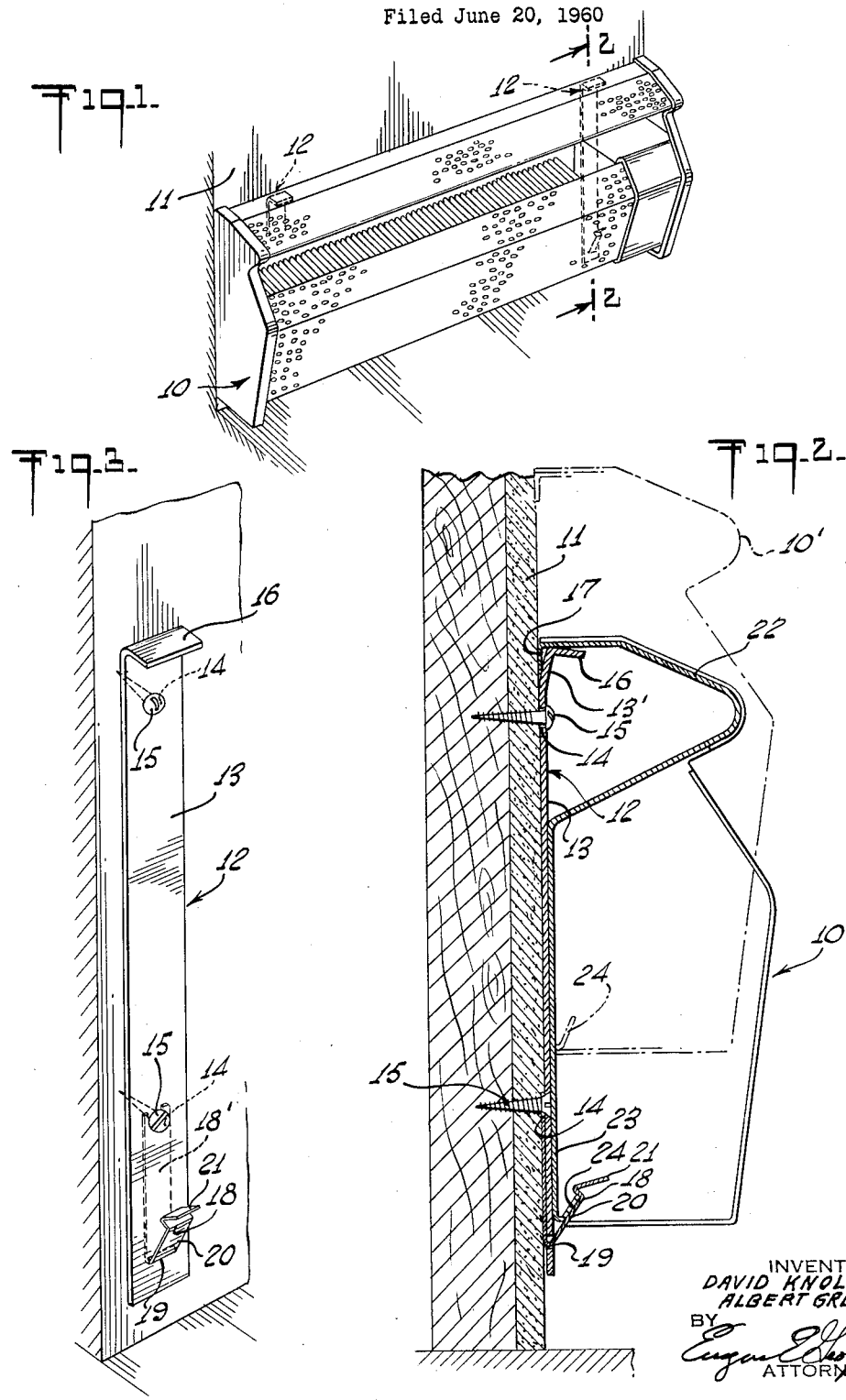
INVENTORS
DAVID KNOLL and
ALBERT GREENHAUS
BY
ATTORNEY – Patented June 5, 1962

3,037,730
ELECTRICAL APPLIANCE AND SURFACE MOUNTING MEANS THEREFOR
David Knoll, Bayside, and Albert Greenhaus, Brooklyn, N.Y., assignors to Berko Electric Manufacturing Corporation, Queens Village, N.Y., a corporation of New York
Filed June 20, 1960, Ser. No. 37,183
4 Claims. (Cl. 248—201)

This invention relates to electrical appliances such as heaters and similar equipment and more specifically concerns an improved wall mount for releasably receiving and holding an appliance on a supporting surface.

One of the difficulties that has heretofore been encountered in the attachment of devices such as heaters and the like to walls is that the mounting holes usually provided in such devices for receiving screws or other fastening means are usually not in line with wall supporting members to which the device should be secured in order to furnish proper support. Furthermore, the fastening means are frequently inserted directly through the body of the heater, making both installation and removal of the heater difficult.

This invention overcomes the disadvantages of prior known mounts for heaters and provides a novel and improved bracket and cooperating heater configuration which greatly facilitates and simplifies the installation of the heater. With this improved structure the heater can be readily secured in position and can be quickly detached for repair or maintenance without the need for special tools.

Another object of the invention resides in a novel and improved bracket for attachment of an electric heater to a wall which is characterized by its simplicity, relatively low cost and ease of installation.

A still further object of the invention resides in a novel and improved mode of attaching devices to walls or other supports.

The above and other objects of the invention will become more apparent from the following description and accompanying drawings forming part of this application.

In the drawings:

FIG. 1 is a perspective view of an electric baseboard heater attached to a wall by bracket means in accordance with the invention;

FIG. 2 is a cross sectional view of FIG. 1 taken along the lines 2—2 thereof; and FIG. 3 is a perspective view of the bracket member shown in FIGS. 1 and 2.

While the mounting means in accordance with the invention may be utilized for mounting different types of appliances, it is particularly useful for mounting baseboard type heating devices which may be in the form of isolated sections or extend continuously about the baseboard of a room.

The baseboard heater presents one of the more difficult mounting problems and, in the case of electric heaters which may need to be detached for maintenance and repair or inspection of the electric wiring, this mounting means affords a most desirable mode of attachment.

Referring now to the drawings, FIG. 1 is a perspective view of a baseboard heater generally denoted by the numeral 10 and supported upon a wall 11 by means of a pair of brackets 12 in accordance with the invention. Each bracket, as shown more clearly in FIGS. 2 and 3, comprises essentially an elongated strip of material 13 having a pair of openings 14 for the insertion of screws 15 into a wall or other suitable supporting means. The upper end of the strip 13 forming the body of the bracket is bent outwardly to form an outwardly extending flanged portion 16 and it is preferable that the upper end 13' of the body 13 be deflected slightly outwardly to accommodate a cooperating flange 17 extending along the upper edge of the heater 10. The lower end of the strip 13 includes a spring member 18 having a V-shaped configuration. The spring extends through a slot 19 in the strip 13 and a portion of the spring 18' lies behind the strip 13 and extends upwardly and preferably slightly beyond the lower opening 14 in the strip 13. The upper end of the spring portion 18' has a U-shaped slot formed in the end which registers with the lower opening 14 in the strip. In this way the lower screw 15, when inserted through the lower opening 14, engages the upper end of the spring part 18' and this action, together with the slot 19 maintains the spring in proper alignment with the bracket 12. The outer end 20 of the spring 18 is inclined sharply upwardly to make an acute angle with the surface of the strip 13 and the outer end of the spring part 20 has a small reverse bend 21.

The heater 10 may have any desirable configuration provided, however, that the upper portion 22 of the heater is adapted to extend inwardly to and lie against the wall 11 and further that the heater has the downwardly depending flange 17 for engaging the upper part of the body 13 of the bracket 12. While in this embodiment of the invention an outwardly extending flange portion 16 is provided on the bracket 12, it is apparent that other configurations may be employed and the flange 16 may be bent downwardly against the bracket part 13' or the upper end of the bracket part 13' may merely be provided with a straight or rounded edge portion that will facilitate engagement of the flange 17 behind the bracket part 13.

The lower portion of the heater is provided with a back member 23 which is adapted to lie against the body 13 of the bracket 12 and the lower end of this back portion 23 is bent upwardly at a sharp angle as indicated at 23. Inasmuch as the bent portion or flange 24 which extends along the bottom of the heater 10 is adapted to engage the spring 18, it is desirable that the acute angle between the flange portion 24 and the wall 23 of the heater be somewhat greater than the angle between the portion 20 of the spring 18 and the face of the bracket body 13.

To mount a heater, such as the heater 10, to a wall, and assuming a conventional wall using 2" x 4" wood studding covered with plaster surface, the studs would be located on the wall and two or more brackets would be secured to those studs bridged by the heater 10. In many cases the studs will not be centered with reference to the desired position of the heater, though as long as the studs are sufficiently far apart for a given heater and are disposed on either side of the center, adequate support will be readily afforded. Furthermore, it is not necessary to drill the heater 10 to receive screws that will be in alignment with the studs, nor is it necessary to endeavor to put screws through the heater body itself while it is being held in position. With this invention, the brackets may be quickly and easily attached to the wall and in proper horizontal alignment. Thereafter, the heater is positioned in place by holding it against the wall in a raised position as shown by the dotted outline 10' in FIG. 2 and then lowering into position in engagement with the brackets. It will be observed that as the heater is lowered, the flange 17 will move downwardly into engagement with the upper end of the bracket body 13 and at the same time the lower, upwardly bent flange portion 24 will be received between the upwardly extending spring portion 20 and the body 13 of the bracket. As the heater is lowered into position, the flange 24 will displace the spring portion 20 outwardly until it attains the lowermost position, whereupon the reversely formed portion 23 of the spring part 20 will snap inwardly over the outer edge of the flange 24 to lock the heater in position.

It will also be observed from the foregoing discussion that the upper ends of the spring portion 20 as well as the heater flange 24 are disposed above the bottom level of the heater and because the heater is of substantial depth and positioned quite close to the floor, the brackets will not be seen, yet there is usually sufficient room to insert the hand beneath the heater to release them.

To remove the heater 10 after it has been secured to the wall by the mounting means in accordance with the invention, it is merely necessary to deflect the spring portions 20 outwardly while placing a slight upward stress on the body of the heater 10. This will cause the flanges 24 to become disengaged from the spring portions 20 and permit the heater to be lifted from its position.

While only one embodiment of the invention has been illustrated and described, it is apparent that other modifications, alterations and changes may be made without departing from the true scope and spirit thereof.

What is claimed is:

1. An electrical appliance and surface mounting means therefor comprising a frame member for said appliance having upper and lower edge portions, a depending member on the upper edge thereof lying against said surface, said lower edge portion having a member inclined upwardly and outwardly, an elongated vertically disposed mounting strip secured to said surface, the upper end of said mounting strip being inclined slightly outwardly to receive snugly said depending member between it and the surface to frictionally urge the last said member against said surface, and an upwardly and outwardly inclined spring member carried at the bottom of said mounting strip and having an offset end portion, said spring member releasably engaging said inclined member to hold said lower edge portion against said strip and retain said depending member in engagement with the upper end of said strip.

2. An electrical appliance and cooperating surface mount comprising an elongated mounting strip having means for securing it to a surface, a spring member carried at one end of said strip and extending upwardly and outwardly therefrom, a frame member on said appliance, means on one edge of said frame member engaging the other end of said strip and means on another edge of said frame member releasably engaging said spring member to hold the frame in engagement with said mounting strip, said one end of said strip further including a curved end portion and said other end of said strip including an opening, and said spring member having a portion extending through said opening and engaging said strip securing means.

3. A mount for attaching a device to a supporting surface comprising an elongated strip having openings for securing it to said surface, said openings being spaced from the ends of said strip, one end of said strip having a rounded portion to facilitate the receipt of an edge of said device between said one end and said surface, the other end of said strip having an opening therein, a substantially V-shaped spring extending through said opening with one leg of said spring lying flat against one face of said strip and between the strip and the surface of the other leg of said spring being inclined outwardly and toward said one end of said strip, said one leg having means thereon registering with at least one of the first said openings to firmly secure said spring in position on the strip when the latter is attached to said surface, said spring being operable to releasably engage another edge of said device to hold the latter on said surface.

4. In an elongated electrical heater for surface mounting, means for securing said heater to said surface comprising an elongated depending flange along the upper edge of said heater, an outwardly and upwardly inclined flange along the lower edge of said heater, at least two heater supporting brackets each including an elongated vertically disposed strip having openings spaced from the ends thereof for attachment to said surface, a rounded portion on the upper end thereof for snugly receiving said depending flange and holding it against said surface, the other end of said strip having an opening therein, a V-shaped spring in said opening with one leg thereof lying flat against the back side of said strip and having means registering with one of the first said openings, the other leg of said spring extending upwardly and outwardly from said strip and terminating in an offset portion, said other leg of said spring releasably engaging and locking said inclined flange in position against said strip and holding said depending flange in engagement with the upper end of said strip.

References Cited in the file of this patent
UNITED STATES PATENTS

| 527,793 | Jaeger | Oct. 23, 1894 |
| 846,022 | Ficener | Mar. 5, 1907 |
| 1,810,229 | Stirrup | June 16, 1931 |